United States Patent Office 3,444,229
Patented May 13, 1969

3,444,229
DISILAHEXANEDIOL
Howard A. Vaughn, Jr., Scotia, N.Y., assignor to General
Electric Company, a corporation of New York
No Drawing. Original application Sept. 9, 1963, Ser. No.
307,346, now Patent No. 3,328,340, dated June 27,
1967. Divided and this application Sept. 28, 1966, Ser.
No. 615,862
Int. Cl. C07f 7/18
U.S. Cl. 260—448.8                    2 Claims

ABSTRACT OF THE DISCLOSURE

The chemical compound 1,1,2,2,4,4-hexamethyl-6,6-diphenyl-3,5-dioxa-4,6-disila-1,6-hexanediol and a process for producing the compound is disclosed. The compound is used as an aid for reducing structure and knit time in certain organopolysiloxane compositions.

---

This application is a division of my application Ser. No. 307,346, filed Sept. 9, 1963, entitled "Organosilicon Compound and Use Thereof" now U.S. Patent 3,328,340.

This invention relates to a new organosilicon compound and its use. More particularly, this application is directed to the chemical compound 1,1,2,2,4,4-hexamethyl-6,6-diphenyl-3,5-dioxa-4,6-disila-1,6-hexanediol, to the preparation of such compound and to its use as an aid for reducing structure and knit time in certain organapolysiloxane compositions.

In the manufacture of silicone rubber articles, an organopolysiloxane convertible to the solid, cured, elastic state is first manufactured. This convertible organopolysiloxane is then mixed with a suitable filler which serves both to extend the convertible organopolysilixane and to improve the physical properties of the final manufactured silicone rubber article. The mixture of the convertible organopolysiloxane and the filler, as well as other ingredients, such as coloring agents and vulcanizing agents, is known as a silicone rubber compound. These silicone rubber compounds are then stored until time for the manufacture of the silicone rubber article. The silicone rubber articles are formed by first "freshening" the silicone rubber compound, adding a vulcanizing agent if necessary, molding or extruding the silicone rubber compound into the desired shape and then curing the shaped silicone rubber compound to form a cured silicone rubber article.

The most common and most useful fillers for the silicone rubber compounds are finely divided reinforcing silica fillers. While these fillers permit the production of cured silicone rubber articles of excellent physical properties, these fillers cause structuring or crepe-aging of the silicone rubber compounds so that during the time interval of days or months between the manufacture of the silicone rubber compound and the time at which such compound is freshened, the compound becomes very difficult to work. When the compound is placed on a rubber mill for freshening, it is found that an excessive time is required to form a smooth, continuous sheet which can be used in the final shaping operation. The time required to form such a smooth, continuous sheet is known as "knit time." With some highly reinforcing silica fillers, this structure problem has been so severe that it has been impossible to mill the filled compositions and form the continuous sheet necessary for the subsequent forming operation. This problem has been recognized in the art and a number of solutions have been proposed. While these various solutions have been successful to some degree, it has been found that none of the prior art materials proposed for addition to organopolysiloxanes has been completely satisfactory in solving the structure problem.

One of the most useful additives for reducing the structure or crepe-aging of silicone rubber compounds has been diphenylsilanediol. While diphenylsilanediol produces satisfactory results, it is very difficult to disperse diphenylsilanediol into filled silicone rubber compounds because the material is a solid at atmperatures up to about 160° C.

The present invention is based on my discovery of the compound 1,1,2,2,4,4-hexamethyl-6,6-diphenyl-3,5-dioxa-4,6-disila-1,6-hexanediol which has the formula:

(1) 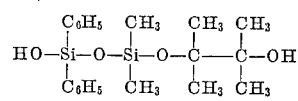

The compound of Formula 1, which will often be referred to hereinafter for brevity as the "diol additive" has a melting point of from 84 to 85° C. It is readily dispersible in silicone rubber compositions containing a silica filler by mixing it in the composition at a temperature above its melting point to produce an organopolysiloxane compound which can stand for extended periods of time without showing any significant signs of structure or crepe-aging.

The diol additive of Formula 1 can be readily prepared by mixing diphenylsilanediol with dimethylcyclopinacoxysilane, which has the formula:

(2) 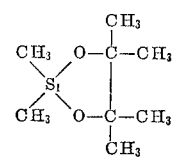

The diol additive of Formula 1 is prepared by merely mixing diphenylsilanediol and dimethylcyclopinacoxysilane in the desired proportions and recovering the desired diol additive from the reaction mixture. The proportions of the reactants can vary within wide limits, for example, from 0.1 to 10 moles of diphenylsilanediol per mole of the dimethylcyclopinacoxysilane. However, since the diol additive is the reaction product of equimolar amounts of the two reactants, it is preferable to employ the reactants in equimolar proportions.

The reaction between the diphenylsilanediol and the dimethylcyclopinacoxysilane occurs spontaneously at room temperature and therefore the reaction can be effected by merely contacting the two reactants at room temperature, i.e., a temperature of around 20 to 25° C. However, since the rate of the reaction increases with temperature, it is sometimes desirable to heat the reactants to an elevated temperature, e.g., a temperature of from 30 to 100° C., to speed the reaction. In general, the reaction to produce the diol additive of Formula 1 is complete in from about 2 to 24 hours, depending upon the temperature of the reaction. After the reaction is completed, the reaction mixture is allowed to cool to room temperature if an elevated temperature has been employed and the desired diol additive is found as a crystalline precipitate in the reaction mixture. This crystalline material is filtered from the reaction mixture and purified by recrystallization from any suitable solvent, such as, for example, benzene, toluene, acetone, dioxane, tetrahydrofuran and the like. If desired, the reaction between the diphenylsilanediol and the dimethylcyclopinacoxysilane can be effected in the presence of a solvent for the reactants which is inert to the reactants and the reaction products under the conditions of the reaction. Suitable solvents include, for example, acetone, dioxane, diethyl ether, tetrahydrofuran, etc.

The organopolysiloxanes with which the present invention is concerned are organopolysiloxanes which are convertible by means known in the art to cured, solid, elastic state. These organopolysiloxanes are generally benzene soluble materials which vary in viscosity from viscous masses to gummy solids depending upon the nature and state of condensation of the starting organopolysiloxanes. In general, these materials have viscosities in the range of from about 10,000 centipoises up to 10 to 20 million centipoises or more. In general, these materials contain an average of from 1.98 to 2.01 organic groups per silicon atom and preferably are polydiorganosiloxanes containing an average of two silicon-bonded organic groups per silicon atom, with the organic groups being attached to silicon atoms through a silicon-carbon linkage. These organopolysiloxanes can be described by the formula:

(3) $$R_n SiO_{\frac{4-n}{2}}$$

where R is an organic group attached to silicon through a silicon-carbon linkage and n has a value of from about 1.98 to about 2.01, preferably having a value of 2.0. Illustrative of the organic groups represented by R in Formula 3 are monovalent hydrocarbon groups, such as, for example, alkyl radicals, e.g., methyl, ethyl, propyl, octyl, etc. radicals; aryl radicals, e.g., phenyl, tolyl, xylyl, etc. radicals; aralkyl radicals, e.g., benzyl, phenylethyl, etc. radicals; cycloalkyl and cycloalkenyl radicals, e.g., cyclohexyl, cycloheptyl, cyclohexenyl, etc. radicals; alkenyl radicals, e.g., vinyl, allyl, etc. radicals, as well as various chlorinated hydrocarbon radicals such as, for example, chloromethyl, chlorophenyl, dibromophenyl, etc. radicals. In addition to the hydrocarbon radicals and halogenated hydrocarbon radicals represented by R in Formula 3, the R group also represents radicals containing other functional groups, such as cyanoalkyl and carboxyalkyl radicals, including beta-cyanoethyl, gamma-cyanopropyl, beta-carboxyethyl, beta-carboxypropyl, etc. Preferably, at least 50% of the organic groups represented by R in Formula 3 are methyl radicals.

Included within the scope of Formula 2 are polydiorganosiloxanes which can be termed copolymers having two or more different types of diorganosiloxane units therein, such as copolymers of dimethylsiloxane units and methylphenylsiloxane units; or copolymers of methylphenylsiloxane units, diphenylsiloxane units, dimethylsiloxane units and methylvinylsiloxane units; as well as copolymers of dimethylsiloxane units, methylvinylsiloxane units and diphenylsiloxane units.

While a number of convertible organopolysiloxanes have been described in the foregoing discussion, it should be understood that the convertible organopolysiloxanes with which the present invention are concerned are well known in the art and descriptions of such materials can be found in Patents 2,448,756, Agens; 2,448,556, Sprung et al.; 2,484,595, Sprung; 2,457,688, Krieble et al.; 2,521,-528, Marsden; 2,490,357, Hyde; 2,541,137, Warrick, and 2,890,188, Konkle et al.

The reinforcing silica fillers with which the present invention is concerned can be described as finely divided silica fillers having a surface area of at least 50, e.g., from 50 to 500, square meters per gram. The fillers are well known in the art and a number are described in Patents 2,541,137, 2,610,167 and 2,657,149. Included within this group of finely divided silica filler are the commercial silica are the commercial silica fillers such as the fume silicas, precipitated silicas and silica aerogels.

The organopolysiloxane compositions of reduced structure with which the present invention is concerned are prepared by mixing together in any suitable fashion the aforementioned convertible organopolysiloxanes, the aforementioned structure-inducing silica fillers, and the diol additive of Formula 1. While the proportions of the various ingredients can vary within extremely wide ranges, the organopolysiloxanes of reduced structure of the present invention preferably comprise, on a weight basis, (A) 100 parts of the convertible organopolysiloxane, (B) from 10 to 200 parts, and preferably from 20 to 60 parts of the structure-inducing silica filler and (C) from about 0.1 to 15 parts of the diol additive of Formula 1, preferably from about 2 to 10 parts of such diol additive.

While the organopolysiloxanes of reduced structure of the present invention can be prepared in a number of ways, it is preferred that the diol additive of Formula 1 be incorporated into the composition at a time no later than the incorporation of the structure-inducing silica filler into the composition. For example, the diol additive of Formula 1 and the convertible organopolysiloxane can be mixed together and the desired amount of the structure-inducing silica filler thereafter added. Most conveniently, this mixing is effected on differential rubber milling rolls or in a doughmixer. Alternatively, the convertible organopolysiloxane, the structure-inducing silica filler and the diol additive can be mixed together on the rubber mills or in a doughmixer. At the time of mixing the ingredients together, it is preferred that the temperature of the mixture be increased to above the melting point of the diol additive, e.g., a milling temperature of 90 to 120° C. so as to melt the additive and facilitate its uniform dispersion in the mixture. After mixing the ingredients together, it is found that the resulting mixed product can stand for extended periods of time and, because structure formation is held to a minimum, the compound can be readily "freshened" by a very brief milling. After freshening, the compound is ready for formation into the desired shape by molding or extrusion, with subsequent curing to convert the organopolysiloxane to the solid, elastic, cured state.

This curing can be effected by chemical vulcanizing agents or by high energy electron irradiation. Most often, chemical vulcanizing agents are employed for the curing operation and any of the conventional curing agents can be employed. In general, these curing agents are free radical catalysts such as organic peroxides including, for example, benzoyl peroxide, tertiary butyl perbenzoate, bis-(dichloro - benzoyl)peroxide, bis-(alpha-cumyl)peroxide and the like. The time required for the curing of the silicone rubber compound varies from several minutes to several hours, depending upon the particular curing catalyst employed and the amount employed. In general, such catalysts are present in an amount ranging from about 0.1 to 10% by weight, based on the weight of the convertible organopolysiloxane. The curing agent can be incorporated into the organopolysiloxane compound during the mixing operation so long as the temperature of the compound during the addition of the curing agent is below the activation temperature of the peroxide. Alternatively, the catalyst can be added during the freshening operation prior to the curing of the organopolysiloxane.

While the above description has identified the types of structure-inducing silica fillers which are employed in the preparation of the organopolysiloxane compositions of reduced structure, it should be pointed out that mixtures of more than one type of structure-inducing filler can be employed. In addition, these compositions can contain both a structure-inducing reinforcing silica filler as well as other types of fillers which are usually non-reinforcing and non-structure-inducing, such as titanium dioxide, lithopone, calcium carbonate, iron oxide, and the like.

In order that those skilled in the art may better understand the practice of the present invention, the following example are given by way of illustration and not by way of limitation. All parts are by weight.

In determining the structure or crepe-aging of the silicone rubber compounds of the present invention, the knit times of such compositions were measured. Knit time was determined on a silicone rubber compound which had been allowed to stand at room temperature for 28 days after it had been first mixed. In the test, a two roll differential mill, 3″ x 8″ was employed in which the speed ratio between the two rolls was 1.4 to 1, and the faster roll revolved at a speed of about 60 revolutions per minute. The mill roll clearance was adjusted to pass a 12 mil thick soft solder slug at a temperature of around 70 to 90° F. In conducting the test for knit time, 30 grams of the compound under test were added to the nip of the roll. When all the compound had passed through the nip once, a stop water was triggered, and the timing begun. The compound was then added to the nip again and in order to keep the bank of compound in motion, it was sometimes necessary to open the mill slightly for a brief interval and then returned to the predetermined 12 mil adjustment. The timing was continued until the compound became plastic and completely covered the width of the faster roll in the form of a continuous solid film. As soon as this happened, the timing was stopped and this elapsed time was recorded as "knit time."

Example 1

Into a reaction vessel fitted with a stirrer, thermometer, and a drying tube were placed 108 grams (0.5 mole) of diphenylsilanediol and 87 grams (0.5 mole) of dimethylcyclopinacoxysilane. The reaction vessel was heated for 3 hours at a temperature of 100° C. and allowed to cool to room temperature (about 20° C.) and remain at such temperature for about 18 hours. During this time, a white, crystalline material had precipitated and this crystalline material was twice recrystallized from benzene. This resulted in the compound 1,1,2,2,4,4-hexamethyl-6,6,-diphenyl-3,5-dioxa-4,6-disila-1,6-hexanediol. The identity of this material was confirmed by hydroxyl group analysis which showed the presence of 9.18 weight percent hydroxyl as compared with the theoretical value of 8.72 percent. The identity of the material was further confirmed by infrared analysis which showed hydroxyl absorption at 3.1 microns, a double attributable to the gem dimethyl group at 7.3 microns, bands at 7.0, 8.9, 9.7, 10.0 and 14.3 microns attributable to the silicon-phenyl bands, a peak at 7.9 microns due to silicone-methyl bands, a peak at 12.5 microns attributable to the dimethylsiloxane unit, a doublet at 8.9 microns, and a band at 13.9 microns attributable to the diphenylsiloxane unit, and a silanol peak at 11.2 microns.

Example 2

An organopolysiloxane composition consisting of 100 parts of a polydiorganosiloxane having a viscosity of about 100,000 centipoises at 25° C., 40 parts of a fume silica having a surface area of about 250 square meters per gram, and available under the trade name "Cab-O-Sil" and 9 parts of 1,1,2,2,4,4-hexamethyl-6,6-diphenyl-3,5-dioxa-4,6-disila-1,6-hexanediol were mixed together in a doughmixer. The polydiorganopolysiloxane was a copolymer containing 5% diphenylsiloxane units, 0.2 mole percent methylvinylsiloxane units, and 94.8 mole percent dimethylsiloxane units. These ingredients were doughmixed first at room temperature and then at a temperature of about 120 to 140° C. for 30 minutes. The material was allowed to cool, age for 28 days at room temperature and the knit time was measured and found to be 5 seconds. Into 100 parts of this mixture was then milled 1.3 parts of a catalyst paste formed by mixing equal weights of bis-(dichlorobenzoyl)peroxide and a methyl silicone fluid. A sheet of this catalyzed material was heated in a mold for 10 mintues at 120° C. and then heated in air for 4 hours at a temperature of 200° C. Physical property measurements on the sheet showed a tensile strength of 1700 pounds per square inch, an elongation of 550%, a Shore A hardness of 58, and a tear strength of 180 pounds per inch. When the above procedure was followed but with the diol additive of Formula 1 omitted, the knit time at the end of 28 days was in excess of 2 hours, indicating a completely unacceptable structure or crepe-aging of the composition.

Example 3

To a doughmixer are added 100 parts of a trimethylsilyl chain-stopped dimethylpolysiloxane gum having a viscosity of 500,000 centipoises at 25° C., 50 parts of a silica aerogel having a surface area of 200 square meters per gram, and 3 parts of 1,1,2,2,4,4-hexamethyl-6,6-diphenyl-3,5-dioxa-4,6-disila - 1,6 - hexanediol and 5 parts of bis-(alpha-cumyl) peroxide. This material was mixed for 30 minutes at a temperature of 90° C. and after 28 days of aging at room temperature, the knit time is of the order of seconds and less than 30 seconds while the knit time of the control from which the diol additive is omitted is greater than 15 minutes.

While the foregoing examples have illustrated several of the embodiments of my invention, it is understood that my invention is directed broadly to the chemical compound 1,1,2,2,4,4-hexamethyl-6,6-diphenyl-3,5-dioxa-4,6-disila-1,6-hexanediol, to the preparation of such compound, and the use of such compound as an agent for the reduction of structure and crepe-aging in conventional silicone rubber formulations which contain a convertible organopolysiloxane of the type previously described and well known in the art and a structure-inducing silica filler of the type previously described and also well known in the art.

What I claim as new and desire to assure by Letters Patent of the United States is:

1. The compound 1,1,2,2,4,4-hexamethyl-6,6-diphenyl-3,5-dioxa-4,6-disila-1,6-hexanediol having the formula,

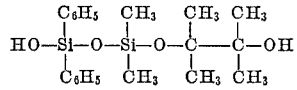

2. A process for the preparation of the compound 1,1,2,2,4,4-hexamethyl-6,6-diphenyl-3,5-dioxa - 4,6 - disila-1,6-hexanediol which comprises contacting diphenylsilanediol with dimethylcyclopinacoxysilane and isolating said compound from the reaction mixture.

References Cited

UNITED STATES PATENTS 2,983,744 5/1961 Knoth _____ 260—448.2 XR
3,046,293 7/1962 Pilce _____ 260—448.2 XR TOBIAS E. LEVOW, *Primary Examiner.*

J. P. PODGORSKI, *Assistant Examiner.*